United States Patent [19]

Nakamura et al.

[11] Patent Number: 5,725,202
[45] Date of Patent: Mar. 10, 1998

[54] FLUID-FILLED ELASTIC BUSHING HAVING DISPLACEMENT RESTRICTOR WITH ELASTIC BUFFER AND STIFF ABUTTING PART

[75] Inventors: Yorikazu Nakamura; Masahiro Shimizu, both of Kasugai; Setsuo Nishi, Toyota; Atsuhiko Murayama, Aichi-ken, all of Japan

[73] Assignees: Tokai Rubber Industries, Ltd.; Toyota Jidosha K.K., both of Japan

[21] Appl. No.: 586,005

[22] Filed: Jan. 16, 1996

[30] Foreign Application Priority Data

Jan. 17, 1995 [JP] Japan ............................ 7-005054

[51] Int. Cl.$^6$ .................................................. F16F 13/00
[52] U.S. Cl. .................................. 267/140.12; 267/219
[58] Field of Search .......................... 267/140.12, 219, 267/140.11, 140.3, 141.2, 141.3, 141.4, 141.5, 141.7; 248/636, 562, 638

[56] References Cited

U.S. PATENT DOCUMENTS

| 4,588,174 | 5/1986 | Konishi | 267/140.12 |
| 4,919,401 | 4/1990 | Yano | 267/140.12 |
| 5,489,086 | 2/1996 | Kanda | 267/140.12 |

FOREIGN PATENT DOCUMENTS

| 0 641 955 A1 | 3/1995 | European Pat. Off. . |
| 2 582 067 | 11/1986 | France . |
| 2 626 947 | 8/1989 | France . |
| 41 26 184 A1 | 2/1992 | Germany . |
| 63-99050 | 6/1988 | Japan . |
| 3-277845 | 12/1991 | Japan . |
| 4-107539 | 9/1992 | Japan . |
| 60-139507 | 7/1995 | Japan . |

Primary Examiner—Douglas C. Butler
Attorney, Agent, or Firm—Parkhurst & Wendel

[57] ABSTRACT

A fluid-filled elastic bushing wherein an elastic body elastically connecting a center shaft member and an outer cylindrical member is provided a displacement restrictor including a stop portion extending from one of the center shaft and outer cylindrical members toward the other member, to restrict an amount of radial displacement of these two members. The stop portion includes an abutting part opposed to the other member with a first radial spacing therebetween, and a shoulder surface adjacent to the abutting part. The displacement restrictor further includes a buffer layer disposed in close contact with the shoulder surface and made of an elastic material whose stiffness is lower than a material of the abutting part. The buffer layer is opposed to the above-indicated other member with a second radial spacing therebetween smaller than the first radial spacing.

14 Claims, 7 Drawing Sheets

FLUID-FILLED ELASTIC BUSHING HAVING DISPLACEMENT RESTRICTOR WITH ELASTIC BUFFER AND STIFF ABUTTING PART

BACKGROUND OF THE INVENTION

1. Field of the Invention

The present invention generally relates to a fluid-filled elastic bushing which includes a center shaft member and an outer cylindrical member which are connected to each other by an elastic body interposed therebetween, and wherein fluid chambers are defined by the outer cylindrical member and the elastic body. The bushing is adapted to provide a vibration damping effect based on flows of a fluid contained in the fluid chambers. More particularly, the present invention is concerned with such a fluid-filled elastic bushing which has displacement restricting means in at least one of the fluid chambers. The displacement restricting means restricts an amount of relative displacement of the inner shaft member and the outer cylindrical member in a radial direction perpendicular to an axis of the bushing.

2. Discussion of the Prior Art

As one type of a vibration damper interposed between two members of a vibration system, there is known a fluid-filled elastic bushing in which a center shaft member and an outer cylindrical member are disposed in a radially spaced-apart relation with each other and are elastically connected to each other by an elastic body interposed therebetween. The elastic body and the outer cylindrical member cooperate with each other to define fluid chambers therebetween which are filled with a suitable fluid. The thus constructed fluid-filled elastic bushing is adapted to exhibit a damping effect with respect to input vibrations on the basis of flows of the fluid, and is used as a suspension bushing of a vehicle, such as a strut bar cushion.

The above type of the fluid-filled elastic bushing 10 has suitable displacement restricting means as disclosed in JP-U-63-99050 and JP-A-3-277845. Described in detail, the displacement restricting means is disposed in the fluid chambers such that it protrudes from the center shaft member toward the outer cylindrical member. When a relatively large vibrational load is applied to the bushing, the displacement restricting means abuts on the inner surface of the outer cylindrical member, whereby an amount of relative displacement of the center shaft member and outer cylindrical member in a radial or diametric direction of the bushing is restricted, so as to prevent the elastic body from being excessively deformed. In general, the displacement restricting means comprises a metallic stop member fitted on the center shaft member and having two protruding portions which extend from the center shaft member in opposite radial directions radially outwardly of the center shaft member. The radial end face of each protruding portion of the stop member is covered with a rubber buffer, and is opposed to the inner circumferential surface of the outer cylindrical member.

In the conventional displacement restricting means constructed as described above, however, the vibrational load applied thereto entirely acts on the rubber buffer. In other words, the rubber buffer may inevitably receive an excessive amount of the input vibrational load. Thus, the durability of the rubber buffer is undesirably deteriorated.

Another example of displacement restricting means is disclosed in JP-U-4-107539, wherein each of the protruding portions of the stop member has a recess formed at a central part of its radial end face. To the surface of this central recess, there is bonded a rubber buffer. When the input vibrational load is relatively small, the rubber buffer is held in abutting contact with the outer cylindrical member, so that an amount of relative displacement of the center shaft member and outer cylindrical member is restricted based on the elasticity of the rubber buffer. When the input vibrational load is relatively large, circumferentially opposite end portions of the radial end face of the protruding portion which define the central recess therebetween and which are not covered with the rubber buffer are brought into abutting contact with the outer cylindrical member, so as to prevent the rubber buffer from collapsing due to abutment against the outer cylindrical member upon application of an excessively large vibrational load to the bushing. Thus, the durability of the rubber buffer is ensured.

The displacement restricting means of the above publication, however, suffers from problems as described below. For instance, the displacement restricting means is apt to generate a butting noise by abutting contact of the rubber buffer with the surface of the central recess of the protruding portion due to excessive deformation of the rubber buffer upon application of a considerably large vibrational load to the bushing. It is also noted that the inner circumferential surface of the outer cylindrical member is covered by a sealing rubber layer which is bonded thereto by vulcanization. The displacement restricting means is also apt to generate a noise due to collapsing or compression of the sealing rubber layer when the radial end faces of the stop member abut on this sealing rubber layer of the outer sleeve upon receiving the large vibrational load.

SUMMARY OF THE INVENTION

The present invention was developed in the light of the above situation. It is therefore an object of the present invention to provide a fluid-filled elastic bushing having displacement restricting means which is capable of restricting, with high stability, an amount of relative displacement of the center shaft member and outer cylindrical member while preventing occurrence of abnormal noises, and which displacement restricting means has improved durability.

The above indicated object may be accomplished according to the principle of the present invention which provides a fluid-filled elastic bushing, comprising: (a) a center shaft member; (b) an outer cylindrical member disposed radially outwardly of the center shaft member with a suitable radial spacing therebetween; (c) an elastic body interposed between and elastically connecting the center shaft member and the outer cylindrical member, the elastic body and the outer cylindrical member at least partially defining at least one fluid chamber filled with a non-compressible fluid; and (d) displacement restricting means, provided in at least one of the at least one fluid chamber, for restricting an amount of relative displacement of the center shaft member and the outer cylindrical member in a radial direction thereof. The displacement restricting means comprises a stop portion which protrudes from one of the center shaft member and the outer cylindrical member toward the other member. The stop portion includes an abutting part which is opposed to the other member with a first radial spacing therebetween in the radial direction. The stop portion has at least one shoulder surface adjacent to the abutting part, while the displacement restricting means further comprises at least one buffer layer which is disposed in close contact with the shoulder surface and which is made of an elastic material whose stiffness is lower than that of a material of the abutting part. Each buffer layer is opposed to the above-indicated other member with a second radial spacing therebetween in the radial direction which is smaller than the first radial spacing.

In the fluid-filled elastic bushing of the present invention constructed as described above, each elastic buffer layer of the displacement restricting means is brought into abutting contact with the center shaft member or outer cylindrical member when the input vibrational load applied to the bushing is comparatively small. The buffer layer is elastically deformed or compressed by the vibrational load, and thus functions to restrict or limit the amount of radial displacement of the center shaft and outer cylindrical members. When the input vibrational load is comparatively large, the relatively stiff abutting part of the stop portion of the displacement restricting means is brought into abutting contact with the center shaft member or outer cylindrical member, whereby an increase in the load acting on the elastic buffer layer is prevented or restricted. Thus, the amount of radial displacement of the center shaft and outer cylindrical members is effectively restricted.

Each elastic buffer layer is disposed in close contact with the shoulder surface adjacent to the abutting part, and is likely to be elastically deformed by the vibrational load such that the buffer layer is displaced in the circumferential direction of the center shaft and outer cylindrical members, away from the abutting part. That is, the elastic buffer layer will not abut on the abutting part and will not generate a butting noise, when the buffer layer is elastically deformed or compressed. Further, since the amount of elastic deformation of the buffer layer is limited by abutting contact of the abutting part with the center shaft member or outer cylindrical member, whereby the buffer layer is protected against excessive deformation and damage. Thus, the buffer layer has improved durability.

It is also noted that the abutting part is adapted to abut directly on the circumferential surface of the center shaft member or outer cylindrical member, without any rubber or other cushion layer being provided on the abutting surface of the abutting part or the above-indicated circumferential surface. If such cushion layer was provided, a noise would be generated due to compression or collapse of the cushion layer. Further, the material of the abutting part has a stiffness higher than that of the elastic material of the buffer layer, the radial displacement of the center shaft and outer cylindrical members can be effectively restricted or limited even when the input vibrational load has a relatively large amplitude.

According to one preferred form of this invention, the stop portion further includes a pair of side supporting parts having a radial distance from a center line of the above-indicated one of the center shaft and outer cylindrical members, which radial distance is smaller than that of the abutting part. In this case, the side supporting parts are located on opposite sides of the abutting part as viewed in a circumferential direction of the center shaft and outer cylindrical members, such that a shoulder surface is provided between the abutting part and each of the side supporting parts, and each buffer layer consists of two buffer layers formed on radial end faces of the pair of side supporting parts, respectively. In the present form of the invention, the thickness of the rubber layer can be easily adjusted by adjusting the radial distance of the side supporting parts, while maintaining the desired radial distance between the buffer layer and the center shaft or outer cylindrical member. Accordingly, the present arrangement has a higher degree of freedom in tuning or adjusting the displacement restricting characteristics of the displacement restricting means.

According to another preferred form of the invention, each of the radial end faces of the pair of side supporting parts has a curved surface substantially following a circumference of the other member. In this form of the invention, the buffer layer is elastically deformed upon abutting contact with the center shaft or outer cylindrical member such that the buffer layer is displaced in the opposite directions along the circumference of the center shaft or outer cylindrical member, away from the abutting part. In this arrangement, the buffer layer does not suffer from excessive local deformation, and the durability of the buffer layer is significantly improved.

BRIEF DESCRIPTION OF THE DRAWINGS

The above and other object, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
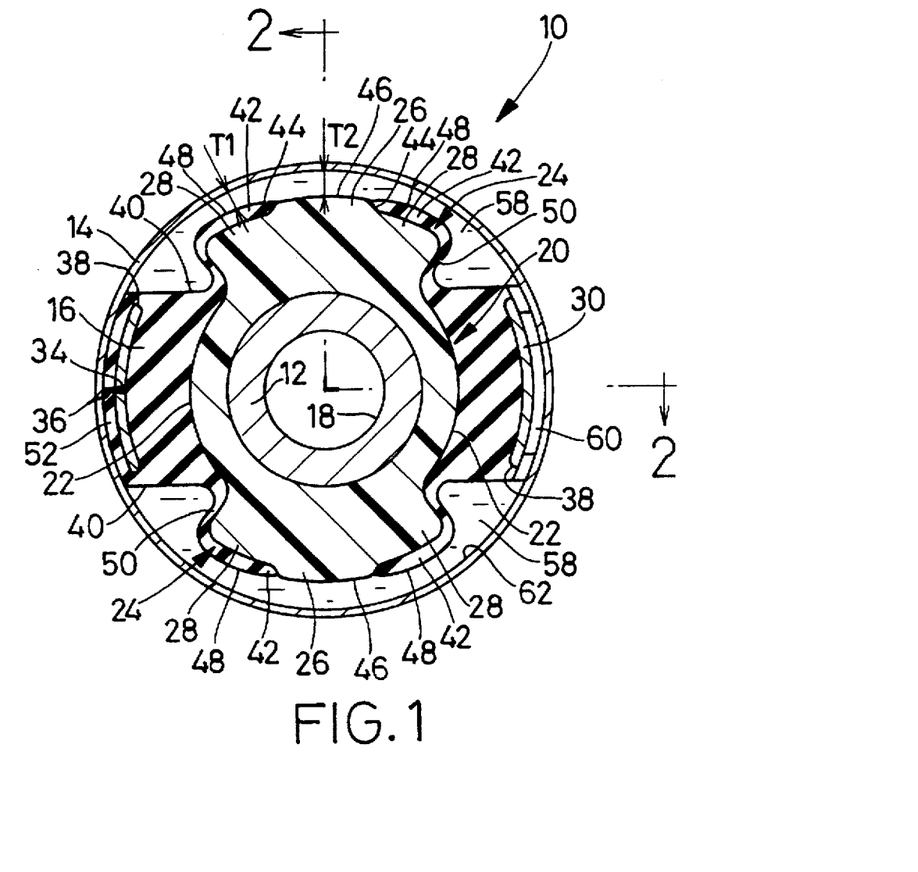
FIG. 1 is an elevational view in transverse cross section of one embodiment of a fluid-filled elastic bushing of the invention in the form of a strut bar cushion, the view being taken along line 1—1 of FIG. 2.
Figure 2:
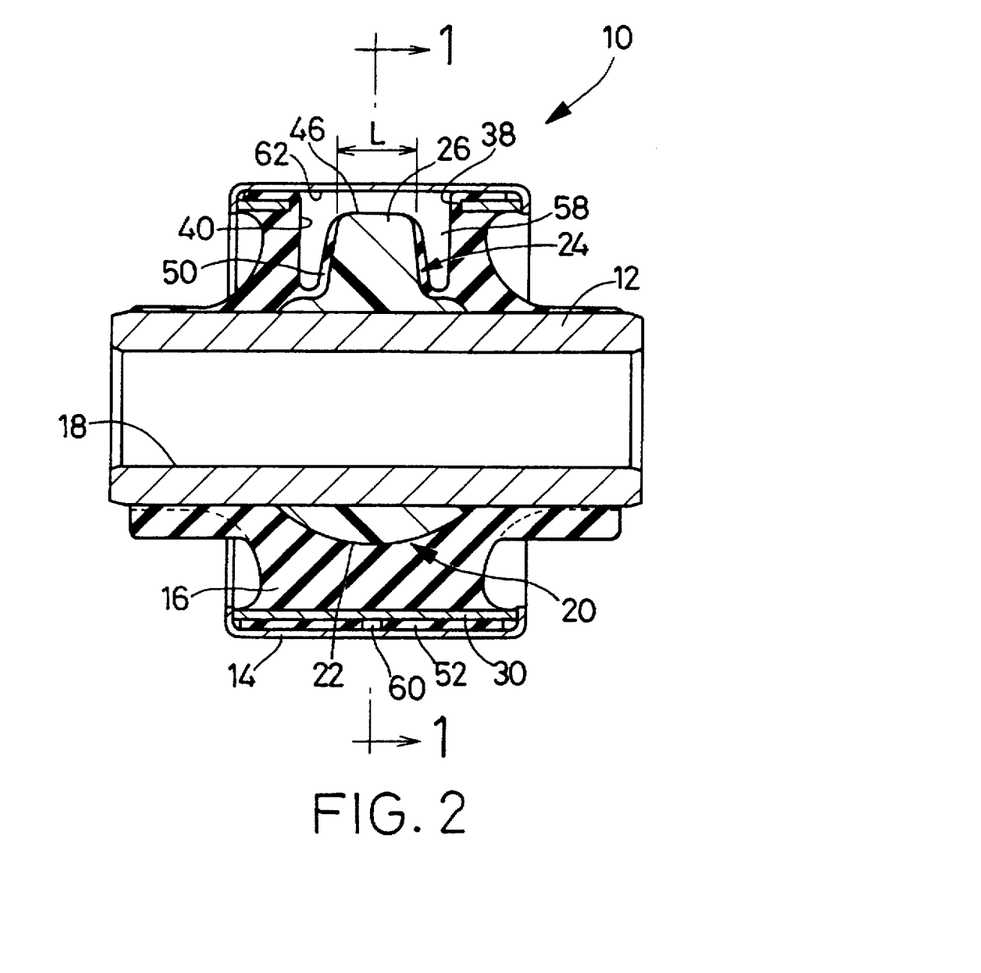
FIG. 2 is a cross sectional view taken along line 2—2 of FIG. 1.

Referring to FIGS. 1 and 2, there is shown a fluid-filled elastic bushing in the form of a strut bar cushion 10 for a motor vehicle, which is constructed according to a preferred embodiment of the present invention. The strut bar cushion 10 includes a center shaft member in the form of an inner sleeve 12 and an outer cylindrical member in the form of an outer sleeve 14, which are both made of metal and disposed in a radially-spaced apart relation with each other with a suitable radial distance therebetween. Between the inner and outer sleeves 12, 14, there is interposed an elastic body 16. The inner and outer sleeves 12, 14 are elastically connected to each other by the elastic body 16. The strut bar cushion 10 is installed on the motor vehicle such that a suitable shaft (not shown) fixed to the body of the vehicle is inserted into a cylindrical bore 18 of the inner sleeve 12, while the outer sleeve 14 is press-fitted in a mounting hole formed at an end portion of a strut bar not shown. Thus, the strut bar cushion 10 connects the strut bar to the body of the vehicle in a vibration damping manner. With the strut bar cushion 10 thus installed on the vehicle, a vibrational load is applied to the strut bar cushion 10, primarily in a radial or diametric direction thereof which substantially corresponds to the vertical direction as viewed in FIG. 1.

Figure 3:
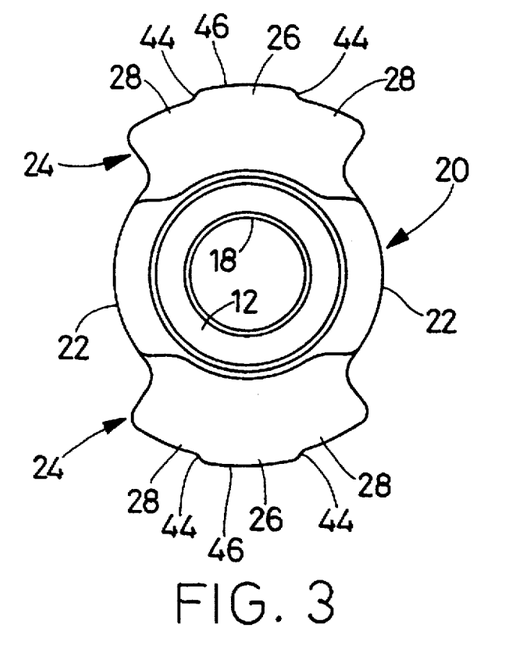
FIG. 3 is an axial end view showing an inner sleeve and a stop member of the strut bar cushion of FIG. 1.
Figure 4:
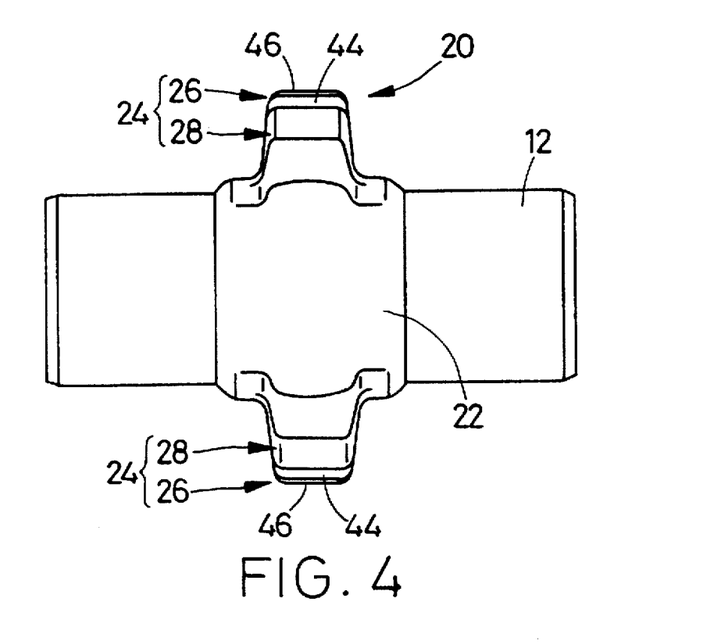
FIG. 4 is a right-hand side elevational view of the inner sleeve and the stop member of FIG. 3.

More specifically described, the inner sleeve 12 is a cylindrical metallic member having a relatively large wall thickness. The strut bar cushion 10 further includes a stop member 20 secured to the outer circumferential surface of the inner sleeve 12 at an axially middle portion thereof. The stop member 20 may be formed of a suitable metallic material. In the present embodiment, the stop member 20 is formed of a synthetic resin material such as nylon 66 which is reinforced with fiber. As shown in FIGS. 3 and 4, the stop member 20 is a generally cylindrical member, and is formed on the inner sleeve 12, by injecting a resin material into a cavity of a mold in which the inner sleeve 12 has been suitably positioned. Thus, the stop member 20 is bonded to the axially middle portion of the inner sleeve 12.

The stop member 20 has a pair of part-spherical portions (part-spherical outer surfaces) 22, 22 which are opposed to each other in a first diametric direction of the inner sleeve 12 (i.e., in the horizontal direction as viewed in FIG. 3), and a pair of stop portions 24, 24 which are opposed to each other in a second diametric direction of the inner sleeve 12 which is perpendicular to the first diametric direction (i.e., opposed to each other in the vertical direction as viewed in FIG. 3). Each stop portion 24 protrudes radially outwards from the corresponding circumferential part of the axially intermediate portion of the stop member 20, and has a circumferential length slightly smaller than a quarter of the entire circumference of the inner sleeve 12. As shown in FIG. 3, the stop portion 24 generally assumes a sectorial shape whose circumferential dimension increases with an increase in the radial distance from the central portion of the stop member 20 (from the center line of the inner sleeve 12). As clearly shown in FIG. 1, the radial end face of the stop portion 24 has a radial distance larger than at the circumferentially middle part thereof than at the circumferentially opposite end parts thereof, so that the circumferentially middle part functions as a central abutting part 26. On the other hand, each of the circumferentially opposite end parts on the opposite sides of the abutting part 26 serves as a side supporting part 28. The radial end faces of the abutting part 26 and the side supporting part 28 are generally flat, i.e., substantially parallel to the axis of the inner sleeve 12 as viewed in FIG. 4, while the radial end faces assume a generally arcuate shape as viewed in FIG. 3.

Figure 5:
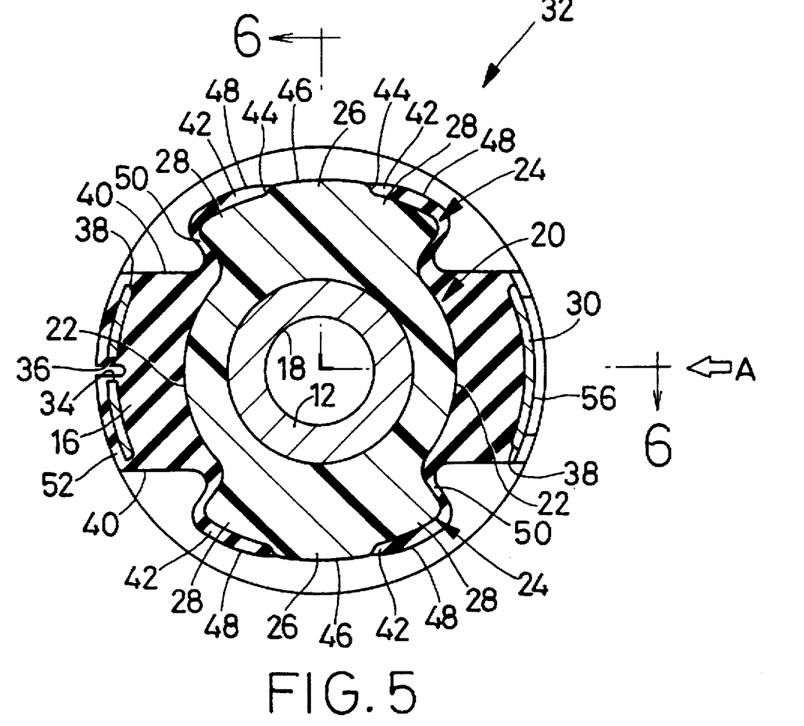
FIG. 5 is a transverse cross sectional view showing an intermediate product which is obtained by vulcanization in the process of producing the strut bar cushion of FIG. 1, the view being taken along line 5—5 of FIG. 6.
Figure 6:
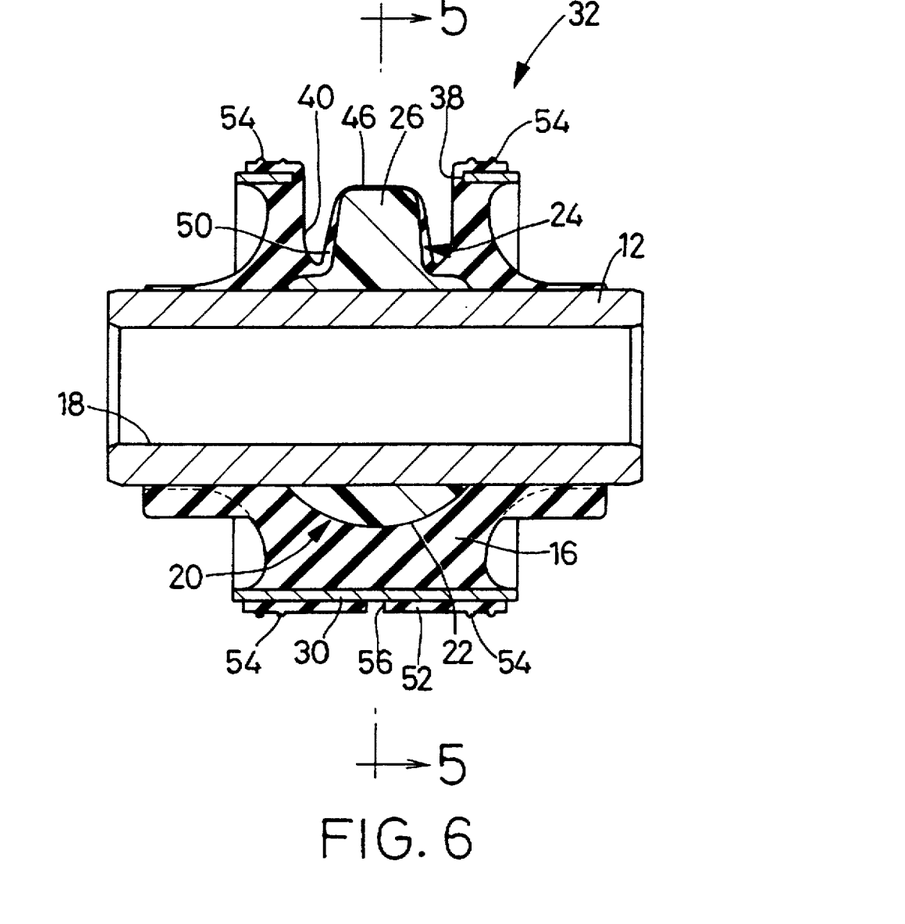
FIG. 6 is a cross sectional view taken along line 6—6 of FIG. 5.

As shown in FIGS. 5 and 6, an intermediate metal sleeve 30 is disposed radially outwardly of the inner sleeve 12 (on which the stop member 20 is mounted), with a suitable radial distance therebetween, in substantially coaxial relation with each other. The intermediate metal sleeve 30 is a generally cylindrical member having a relatively small wall thickness and a relatively large diameter. The elastic body 16 is interposed between the inner sleeve 12 and the intermediate metal sleeve 30. The elastic body 16 is a generally cylindrical rubber member having a relatively large wall thickness. During vulcanization of a rubber material to form the elastic body 16, the inner sleeve 12 and the intermediate metal sleeve 30 are secured to the inner and outer circumferential surfaces of the elastic body 16, respectively. Thus, a unitary intermediate product 32 as shown in FIGS. 5 and 6 is prepared.

The intermediate metal sleeve 30 has an axial slot 34 which is formed in one of two circumferential portions thereof which are opposed to each other in the above-indicated first diametric direction in which the part-spherical portions 22, 22 of the stop member 20 are opposed to each other. The axial slot 34 has a suitable width and extends over the entire axial length of the intermediate metal sleeve 30. The elastic body 16 has an axial cutout or groove 36 which is formed over its entire axial length, in a circumferential portion thereof aligned with the axial slot 34 of the intermediate metal sleeve 30. The axial cutout 36 has a radial depth larger than the wall thickness of the intermediate metal sleeve 30. The axial cutout 36 is open through the axial slot 34. When the outer sleeve 14 is subjected to a suitable drawing operation as described below, the intermediate sleeve 30 is easily radially inwardly compressed owing to the axial slot 34, and the elastic body 16 is also easily radially inwardly pre-compressed owing to the axial cutout 36, which is eventually eliminated.

The intermediate metal sleeve 30 further has a pair of windows 38, 38 which are formed in axially intermediate portions thereof and are open in diametrically opposite directions in which the stop portions 24 of the stop member 20 extend. The elastic body 16 has a pair of pockets 40, 40 formed in alignment with the respective windows 38, 38 of the intermediate metal sleeve 30. These pockets 40, 40 are open on the outer circumferential surface of the intermediate metal sleeve 30 through the corresponding windows 38, 38. The above-indicated stop portions 24, 24 of the stop member 20 protrude from axially middle portions of the bottom walls of the respective pockets 40, 40 formed in the elastic body 16, as shown in FIG. 6. A pair of rubber buffer layers 42, 42 each acting as a buffer portion are bonded, by vulcanization, to the respective radial end faces of the side supporting parts 28, 28 of each of the stop portions 24, 24 of the stop member 20, so as to cover the entire surfaces of the side supporting parts 28. As shown in FIG. 5, the central abutting part 26 has a radial end face 46, while the rubber buffer layers 42 have end faces 48. Shoulder surfaces 44, 44 are formed between the radial end face 46 and the side supporting parts 28 on which the rubber buffer layers 42 are formed. The rubber buffer layer 42 is not provided on the radial end face 46 of the abutting part 26. Thus, the radial end face 46 of the abutting part 26 is exposed directly in the corresponding pocket 38. The rubber buffer layers 42 are disposed in close contact with the shoulder surfaces 44, 44 between the abutting part 26 and the side supporting parts 28. In the present embodiment, in particular, the rubber buffer layers 42 are bonded to the substantially entire surfaces of the shoulder surfaces 44. As shown in FIG. 5, the end faces 48 of the rubber buffer layers 42 are positioned outwardly of the end face 46 of the abutting part 26 as viewed in the radial direction of the inner sleeve 12. The rubber buffer layers 42 are provided on the circumferentially opposite sides of the central abutting part 26 so as to cover the radial end faces of the side supporting parts 28 and the shoulder surfaces 44, such that the rubber buffer layers 42 are in close contact with the shoulder surfaces 44.

In the present embodiment, the rubber buffer layers 42 are formed integrally with the elastic body 16. Described more specifically, a relatively thin rubber layer 50 integral with the elastic body 16 is formed over the entire circumferential surface of each stop portion 24 except the radial end face 46 of the abutting part 26, such that the rubber layer 50 provides the rubber buffer layers 42 firmly secured to the side supporting parts 28 of the stop member 20.

Figure 7:
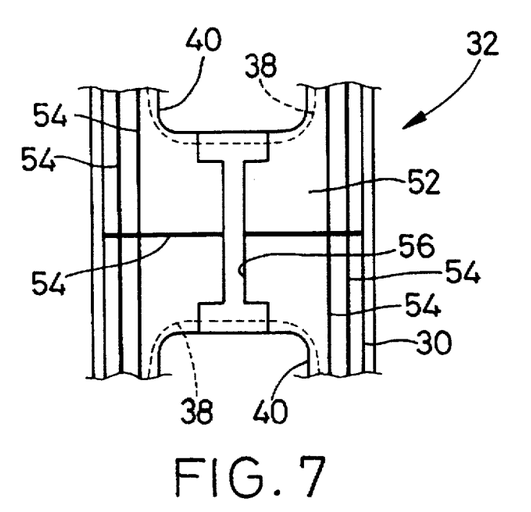
FIG. 7 is a view showing the intermediate product of FIG. 5 as viewed in a direction of arrow A in FIG. 5.

The outer circumferential surface of the intermediate metal sleeve 30 is substantially entirely coated with a relatively thin sealing rubber layer 52 which is formed integrally with the elastic body 16. As shown in FIG. 7, the sealing rubber layer 52 has an arcuate groove 56 formed in a circumferential portion thereof which is diametrically opposite to the axial slot 34 of the intermediate metal sleeve 30. The arcuate groove 56 extends over a part of the outer circumference of the intermediate metal sleeve 30 between the pair of windows 38, 38 thereof, so as to connect the pair of pockets 40, 40 of the elastic body 16 to each other. As shown in FIG. 7, the arcuate groove 56 has a larger width dimension at the circumferentially opposite ends thereof which are open to the pockets 40, 40.

As indicated in FIG. 7, the sealing rubber layer 52 has a plurality of sealing lips 54 as integral parts thereof. These sealing lips 54 consist of: lips formed on the axially end portions of the sealing rubber layer 52 so as to extend continuously in the circumferential direction thereof; lips formed along and on the opposite sides of the axial slot 34 and axial cutout 36, so as to extend in the axial direction of the intermediate sleeve 30; and a lip formed so as to extend in the axial direction of the sleeve 30 and passes across the arcuate groove 56 at right angles.

The intermediate product 32 thus produced is inserted into the outer sleeve 14 which is a generally cylindrical metal member with a relatively large diameter. The outer sleeve 14 is radially inwardly compressed so as to reduce its diameter by effecting a suitable drawing operation, which is performed, for example, by using eight drawing dies disposed around the outer sleeve 14. Thus, the outer sleeve 14 is fixedly fitted on the outer circumferential surface of the intermediate metal sleeve 30 of the intermediate product 32. At the same time, the outer sleeve 14 is caulked at its axially end portions against the intermediate metal sleeve 30. When the outer sleeve 14 is subjected to the drawing operation as described above, the axial cutout 36 of the elastic body 16 formed in alignment with the axial slot 34 of the intermediate metal sleeve 30 is narrowed or substantially eliminated with a result of reduction of the diameter of the intermediate metal sleeve 30, whereby the elastic body 16 is easily pre-compressed. When the diameter of the outer sleeve 14 is thus reduced, the sealing rubber layer 52 and the sealing lips 54 are compressed or squeezed between the intermediate sleeve 30 and the outer sleeve 14. Thus, fluid tightness between these two sleeves 30, 14 is established.

As a result of the assembling of the intermediate product 32 and the outer sleeve 14, the pockets 40, 40 of the elastic body 16 and the arcuate groove 56 are fluid-tightly closed by the outer sleeve 14 fitted on the intermediate product 32, so as to provide a pair of fluid chambers 58, 58 filled with a suitable non-compressible fluid, and an orifice passage 60 through which the fluid chambers 58, 58 communicate with each other. When a vibrational load is applied to the thus produced strut bar cushion 10 in the substantially vertical direction thereof as viewed in FIG. 1, the fluid is forced to flow between the two fluid chambers 58, 58 through the orifice passage 60, whereby the input vibrations can be effectively damped or isolated on the basis of restricted flows or resonance of the fluid.

For permitting the strut bar cushion 10 to exhibit a high damping effect with respect to the input vibrations having a frequency range corresponding to road-oriented noise, for instance, the fluid chambers 58 are filled with a low viscous fluid whose viscosity is 0.1 Pa·s or lower, such as water, alkylene glycol, polyalkylene glycol or silicone oil. Further, the length and/or the cross sectional area of the orifice passage 60 are suitably tuned for the same purpose as described just above. The filling of the fluid chambers 58 are advantageously conducted by mounting the outer sleeve 14 on the intermediate product 32 in a mass of the selected low viscous fluid.

In the thus constructed strut bar cushion 10, each stop portion 24 protrudes from the axially middle portion of the bottom wall of the corresponding fluid chamber 58 in the radial direction of the inner sleeve 12, and the radial end face 46 of the abutting part 26 and the radial end faces 48 of the rubber buffer layers 42, 42 are opposed to the inner circumferential surface 62 of the outer sleeve 14 with respective suitable radial distances therebetween. It is noted that neither the radial end face 46 of the abutting part 26 and nor the inner circumferential surface 62 of the outer sleeve 14 are covered with a rubber material. As clearly shown in FIG. 1, a radial distance T1 between each rubber buffer layer 42 and the outer sleeve 14 is made smaller by a suitable amount than a radial distance T2 between each abutting part 26 and the outer sleeve 14.

Figure 8:
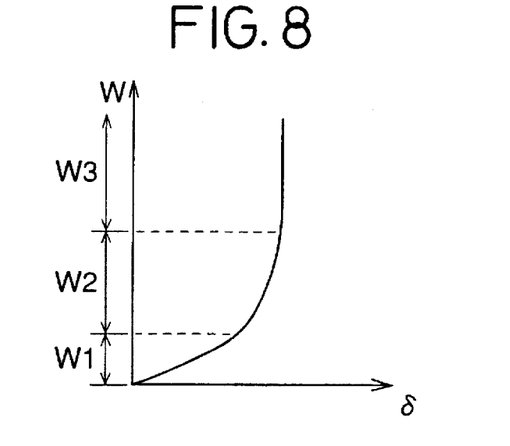
FIG. 8 is a graph showing a relationship between a load received by the strut bar cushion of FIG. 1 and a relative displacement amount of the inner sleeve and an outer sleeve of the cushion.

Referring next to a graph of FIG. 8, there is shown a load-displacement curve which represents a relationship between an input vibrational load (W) and an amount (δ) of relative displacement of the inner and outer sleeves of the present strut bar cushion 10. When the input vibrational load W is relatively small, i.e., when the input vibrational load W is in a range W1 indicated in the graph of FIG. 8, the strut bar cushion 10 exhibits soft spring characteristics based on the elastic deformation of the elastic body 16. When the input vibrational load W is larger than W1, i.e., when the input vibrational load W is in a range W2, the radial end faces 48 of the rubber buffer layers 42 are brought into abutting contact with the inner circumferential surface 62 of the outer sleeve 14, whereby, the relative displacement amount (δ) of the inner sleeve 12 and the outer sleeve 14 is restricted under a damping action of the rubber buffer layers 42. When the input vibrational load W is in a range W3 indicated in the graph of FIG. 8, the radial end faces 46 of the abutting parts 26 as well as the radial end faces 48 of the rubber dampers 42 are forced to be in abutting contact with the inner circumferential surface 62 of the outer sleeve 14. In this state, the rubber buffer layers 42 are prevented from being excessively elastically deformed, by the abutting parts 26 abutting on the inner circumferential surface 62 of the outer sleeve 14, whereby the relative displacement amount (δ) of the inner and outer sleeves 12, 14 is restricted with higher stability. It is noted that the abutting parts 26 and the rubber buffer layers 42 cooperate with each other to constitute major portions of displacement restricting means for restricting the amount of relative displacement of the inner and outer sleeves 12, 14.

In the present embodiment, the radial end face 46 of each abutting part 26 adapted to be in abutting contact with the inner circumferential surface 62 of the outer sleeve 14 is not covered with a rubber material, so that the relative displacement amount of the inner and outer sleeves 12, 14 is restricted with higher stability owing to a comparatively high degree of stiffness or hardness of the synthetic resin material of the abutting part 26. Prior to abutment of the abutting parts 26 against the outer sleeve 14, however, the rubber buffer layers 42 are brought into abutting contact with the outer sleeve 14 and are elastically deformed. Accordingly, the energy of the input vibrational load is absorbed by the elastic deformation of the rubber buffer layers 42, whereby the outer sleeve 14 does not suffer from large impact or shock which would act thereon upon abutting contact with the comparatively hard abutting parts 26, and the generation of butting noise between the abutting parts 26 and the outer sleeve 14 can be reduced or avoided. Further, the impact or shock and the butting noise associated with the abutting part 26 can be effectively avoided based on instantaneous elastic deformation of the synthetic resin material of the abutting part 26.

The present strut bar cushion 10 constructed as described above is capable of restricting the relative displacement amount (δ) of the inner and outer sleeves 12, 14 while exhibiting a suitable damping action owing to the rubber buffer layers 42 in the intermediate load range of the input vibration (in the range "W2" indicated in the graph of FIG. 8), as clearly shown in the load-displacement curve of FIG. 8.

In the strut bar cushion 10 according to the present embodiment, the amount of deformation of the rubber buffer layers 42 is restricted owing to the abutment of the abutting parts 26 onto the outer sleeve 14, so as to prevent generation of abnormal noise due to collapsing or compression of the rubber buffer layers 42. Further, the rubber buffer layers 42 do not suffer from cracking or separation from the side supporting parts 28 of the stop member 20 which would be otherwise caused by the excessive elastic deformation of the rubber buffer layers 42. Thus, the rubber buffer layers 42 has improved durability.

Since the rubber buffer layers 42 are bonded to the shoulder surfaces 44 which are located on the circumferentially opposite sides of each of the abutting parts 26, the present strut bar cushion 10 is free from a problem that the rubber buffer layers 42 hit on the abutting parts 26 due to its elastic deformation upon application of an excessively large input vibrational load, which would unfavorably cause a butting noise as in the conventional elastic bushing. In the present embodiment, the radial end faces of the side supporting parts 28 covered with the rubber buffer layers 42 have arcuately curved surfaces substantially following the circumference of the outer sleeve 14. When the rubber buffer layers 42 formed on the side supporting parts 28 abut on the outer sleeve 14, the rubber buffer layers 42 are elastically deformed such that the layers 42 are displaced in circumferentially opposite directions of the stop portion 24, away from the abutting part 26, whereby the rubber buffer layers 42 do not suffer from local excessive deformation, assuring an excellent durability of the rubber buffer layers 42.

In the above-constructed strut bar cushion 10, the rubber buffer layers 42 are provided on the opposite sides of each abutting part 26 as viewed in the circumferential direction of the stop member 20. Accordingly, the stop member 20 of the present strut bar cushion 10 is capable of assuring the displacement restricting characteristics with high stability even when the input vibration is more or less offset from the above-indicated nominal load receiving direction (i.e., the vertical direction as viewed in FIG. 1), due to oscillation of the strut bar.

Each of the side supporting parts 28 of the present strut bar cushion 10 is covered with the rubber buffer layers 42. By adjusting the radial distance of the side supporting parts 28, the thickness of the rubber buffer layers 42 can be easily adjusted while keeping the radial distance T1 between the rubber buffer layer 42 and the outer sleeve 14 at a predetermined suitable value. Therefore, the present arrangement has a higher degree of freedom in tuning the displacement restricting characteristics to be offered by the displacement restricting means (20, 42).

In the present strut bar cushion 10, the radial end faces 46 of the abutting parts 26 which are brought into abutting contact with the outer sleeve 14 upon application of a relatively large load are substantially perpendicular to the load-receiving direction as described above. In the fluid-filled elastic bushing disclosed in the above-identified publication JP-A-4-107539, a pair of abutting portions are formed on the circumferentially opposite sides of each protruding portion of a stop member, and the surfaces of the abutting portions are not perpendicular to the load-receiving direction. Unlike this prior art bushing, the present strut bar cushion 10 permits the abutting part 26 to have increased strength to withstand the input vibrational load, whereby the abutting part 26 can be advantageously formed of a resin material.

Since the rubber buffer layers 42 in the present embodiment are formed on the circumferentially opposite sides of the abutting parts 26, an axial length "L" (as indicated in FIG. 2) of the displacement restricting means constituted by the rubber buffer layers 42 and the stop portions 24 of the stop member 20 can be made smaller even in the presence of the rubber buffer layers 42, assuring an accordingly large volume of each fluid chamber 58. At the same time, the relatively small length "L" results in reduced stiffness of the strut bar cushion 10 in the torsional direction of the inner and outer sleeves 12, 14, leading to a reduced resistance of the cushion 10 to a torsional force transmitted via the strut bar.

The stop member 20 of the present strut bar cushion 10 has part-spherical portions 22, 22 which are opposed to each other in the above-mentioned first diametrical direction which is perpendicular to the above-mentioned second diametric direction in which the two stop portions 24, 24 are opposed to each other. Thus, the hardness or stiffness of the strut bar cushion 10 in the torsional direction is further reduced to further reduce the resistance of the cushion 10 to the torsional force.

The strut bar cushion 10 constructed according to the present embodiment has the displacement restricting means which is constituted by the stop portion 24 of the stop member 20 and the rubber buffer layers 42 and which is disposed in each of the two fluid chambers 58. The displacement restricting means has a generally sectorial shape whose circumferential dimension increases with an increase in the radial distance from the central portion of the stop member 20. In this arrangement, the surface area of the radial end faces 48, 46 of the rubber buffer layers 42 and the abutting part 26 which are to be brought into abutting contact with the outer sleeve 14 can be made large while assuring a sufficient volume of the fluid chamber 58, without adversely influencing the damping characteristics to be exhibited by the elastic body 16.

While the present invention has been described in its presently preferred embodiment, it is to be understood that the invention is not limited to the details of the illustrated embodiment, but may be otherwise embodied.

Although the strut bar cushion 10 of the illustrated embodiment has the two fluid chambers 58, 58, the number of the fluid chambers is not limited to that of the illustrated embodiment. The principle of the present invention is equally applicable to a fluid-filled elastic bushing having a single or three or more fluid chambers. When the bushing has a plurality of fluid chambers, the displacement restricting means of the present invention is disposed in at least one of the plurality of fluid chambers.

The kind and viscosity of the non-compressible fluid to be filled in each fluid chamber are not limited to those in the illustrated embodiment, but are suitably determined depending upon the intended damping characteristics of the bushing. For instance, the principle of the present invention may be applicable to a fluid-filled elastic bushing whose fluid chambers are filled with a highly viscous fluid whose viscosity is not smaller than 10 Pa.s, for the purpose of assuring the damping effect on the basis of a shearing effect of the highly viscous fluid.

In the illustrated embodiment, the rubber buffer layers 42 are bonded to the shoulder surfaces 44 located on the circumferentially opposite sides of the abutting part 26. Each rubber buffer layer 42 may be disposed in close contact with the corresponding shoulder surface 44, without being bonded thereto.

The inner circumferential surface 62 of the outer sleeve 14 may be covered with a sealing rubber layer as long as the portions of the inner circumferential surface 62 for abutting contact with the respective abutting parts 26 of the stop member 20 are not covered with the rubber layer. In this case, the sealing rubber layer 52 on the intermediate metal sleeve 30 may be eliminated.

The center shaft member may be formed of a suitable resin material, so that the stop member 20 is formed integrally with the center shaft member. In this case, the stop member need not have a cylindrical mounting portion as provided in the illustrated embodiment. Alternatively, the stop member may be fixed to the outer circumference of the center shaft member, rather than it is injection-molded on the metallic center shaft member 12. For instance, a separately prepared stop member may be press-fitted on the outer circumference of the center shaft member.

In the illustrated embodiment, the rubber buffer layers 42 are provided on the circumferentially opposite sides of each abutting part 26. However, the rubber buffer layers 42 may be otherwise disposed as long as they are disposed adjacent to the corresponding abutting part 26. For instance, the rubber buffer layers 42 may be provided on the axially opposite sides of the abutting part 26, or around the periphery of the abutting part 26.

Although each stop portion 24 of the stop member has a sectorial shape in the embodiment as described above, the stop portion 24 may have an elongate shape which has a constant circumferential dimension over the entire radial length.

While the strut bar cushion 10 for a motor vehicle has been described as one embodiment of the invention, the principle of the present invention may be applicable to suspension bushings other than the strut bar cushion, and fluid-filled elastic bushings for use on devices or equipment other than the motor vehicle.

It is to be understood that the present invention may be embodied with various changes, modifications and improvements which may occur to those skilled in the art, without departing from the spirit and scope of the present invention defined in the following claims.

What is claimed is:

1. A fluid-filled elastic bushing comprising:
   a center shaft member;
   an outer cylindrical member disposed radially outwardly of said center shaft member with a suitable radial spacing therebetween;
   an elastic body interposed between and elastically connecting said center shaft member and said outer cylindrical member, said elastic body and said outer cylindrical member at least partially defining at least one fluid chamber filled with a non-compressible fluid; and
   displacement restricting means, provided in at least one of said at least one fluid chamber, for restricting an amount of relative displacement of said center shaft member and said outer cylindrical member in a radial direction thereof, said displacement restricting means comprising a stop portion which protrudes from one of said center shaft member and said outer cylindrical member toward the other member,
   said stop portion including an abutting part having an end face which is opposed to said other member, at least one side supporting part and at least one shoulder surface provided between said abutting part and said at least one side supporting part, said at least one side supporting part being opposed to said other member with a distance therebetween as viewed in a load-receiving direction, which distance is larger than a distance between said end face of said abutting part and said other member as viewed in said load-receiving direction, and said displacement restricting means further comprising at least one buffer layer which is disposed in close contact with said at least one shoulder surface and which is made of an elastic material whose stiffness is lower than that of a material of said abutting part, said at least one buffer layer and said abutting part being opposed to said other member in said load-receiving direction such that said at least one buffer layer is brought into abutting contact with said other member prior to abutment of said abutting part against said other member.

2. A fluid-filled elastic bushing according to claim 1, wherein said stop portion further includes a pair of side supporting parts having a radial distance from a center line of said center shaft member, which radial distance is smaller than that of said abutting part, said side supporting parts being located on opposite sides of said abutting part as viewed in a circumferential direction of said center shaft and outer cylindrical members, such that a shoulder surface is provided as said at least one shoulder surface between said abutting part and each of said side supporting parts, said at least one buffer layer consisting of two buffer layers formed on radial end faces of said pair of side supporting parts, respectively.

3. A fluid-filled elastic bushing according to claim 2, wherein each of said radial end faces of said pair of side supporting parts has a curved surface substantially following a circumference of said other member.

4. A fluid-filled elastic bushing according to claim 1, wherein said at least one fluid chamber consists of a plurality of fluid chambers, and said restricting means is provided in each of said plurality of fluid chambers.

5. A fluid-filled elastic bushing according to claim 1, wherein said stop portion of said displacement restricting means protrudes from said center shaft member toward said outer cylindrical member.

6. A fluid-filled elastic bushing according to claim 5, wherein said stop member has a circumferential dimension as measured in a circumferential direction of said center shaft member, which circumferential dimension increases in a radial direction from said center shaft member toward said outer cylindrical member.

7. A fluid-filled elastic bushing according to claim 1, wherein said at least one buffer layer is bonded to said at least one shoulder surface.

8. A fluid-filled elastic bushing according to claim 1, wherein said at least one fluid chamber consists of two fluid chambers which are opposed to each other in a first diametric direction of said center shaft member in which a vibrational load is primarily applied to the bushing, said stop portion of said displacement restricting means being provided in each of said two fluid chambers and further comprising a pair of part-spherical portions which are disposed radially inwardly of said stop portions in said two fluid chambers.

9. A fluid-filled elastic bushing according to claim 1, further comprising a thin rubber layer which is formed integrally with said elastic body and said at least one buffer layer, said thin rubber layer covering said stop portion except a radial end face of said abutting part.

10. A fluid-filled elastic bushing according to claim 1, further comprising an intermediate metal sleeve secured to an outer surface of said elastic body, and a sealing rubber layer formed on an outer circumferential surface of said intermediate sleeve, said intermediate sleeve having at least one window each of which is aligned with a corresponding one of said at least one fluid chamber, said outer cylindrical member being fitted on said intermediate sleeve via said sealing rubber layer.

11. A fluid-filled elastic bushing according to claim 10, said intermediate metal sleeve has an axial slot extending over an entire axial length thereof, said slot being formed in a circumferential portion of said intermediate metal sleeve which is spaced from said at least one window in a circumferential direction of said intermediate metal sleeve.

12. A fluid-filled elastic bushing according to claim 11, wherein said elastic body has an axial cutout formed in an outer circumferential surface thereof so as to extend over an entire axial length thereof, said axial cutout being aligned with said axial slot of said intermediate metal sleeve.

13. A fluid-filled elastic bushing according to claim 10, wherein said at least one fluid chamber consists of two fluid chambers, and said displacement restricting means is provided in each of said two fluid chambers, said intermediate metal sleeve having two windows aligned with said two fluid chambers, said sealing rubber layer having an arcuate groove formed in a circumferential portion thereof which is diametrically opposite to said slot of said intermediate metal sleeve, said arcuate groove extending a part of an outer circumference of said intermediate metal sleeve between said two windows, said arcuate groove being closed by an inner circumferential surface of said outer cylindrical member to thereby form an arcuate orifice for fluid communication of said two fluid chambers.

14. A fluid-filled elastic bushing, comprising:

a center shaft member;

an outer cylindrical member disposed radially outwardly of said center shaft member with a suitable radial spacing therebetween;

an elastic body interposed between and elastically connecting said center shaft member and said outer cylindrical member, said elastic body and said outer cylindrical member at least partially defining at least one fluid chamber filled with a non-compressible fluid; and displacement restricting means, provided in at least one of said at least one fluid chamber, for restricting an amount of relative displacement of said center shaft member and said outer cylindrical member in a radial direction thereof, said displacement restricting means comprising a stop portion which protrudes from one of said center shaft member and said outer cylindrical member toward the other member, said stop portion including an abutting part having an end face which is opposed to said other member, at least one side supporting part and at least one shoulder surface provided between said abutting part and said at least one side supporting part, said at least one side supporting part being opposed to said other member with a distance therebetween as viewed in a load-receiving direction, which distance is larger than a distance between said end face of said abutting part and said other member as viewed in said load-receiving direction, and said displacement restricting means further comprising at least one buffer layer disposed in close contact with said at least one shoulder surface and which is made of an elastic material whose stiffness is lower than that of a material of said abutting part, said at least one buffer layer and said abutting part being opposed to said other member in said load-receiving direction, whereby, upon application of a load causing relative displacement of said center shaft member and said outer cylindrical member in a radial direction thereof, said elastic body deforms, said buffer layer contacts said other member thereby compressing said buffer layer and then said end face of said abutting part contacts said other member in that order.

* * * * *